United States Patent
Smith et al.

(10) Patent No.: US 6,433,798 B1
(45) Date of Patent: Aug. 13, 2002

(54) STATIONARY SCROLLING FOR USER INTERFACES

(75) Inventors: Randall B. Smith, Palo Alto; Antero K. P. Taivalsaari, Cupertino, both of CA (US)

(73) Assignee: Sun Microsystems, Inc., Palo Alto, CA (US)

( * ) Notice: Subject to any disclaimer, the term of this patent is extended or adjusted under 35 U.S.C. 154(b) by 0 days.

(21) Appl. No.: 09/303,056

(22) Filed: Apr. 30, 1999

(51) Int. Cl.[7] .................................................. G06F 3/00
(52) U.S. Cl. ...................... 345/764; 345/768; 345/784; 345/973; 345/629
(58) Field of Search ................................. 345/764, 768, 345/766, 850, 629, 851, 630, 634, 637, 639, 848, 854, 784, 786, 973

(56) References Cited

U.S. PATENT DOCUMENTS

| | | | | |
|---|---|---|---|---|
| 5,949,432 A | * | 9/1999 | Gough et al. | 345/435 |
| 5,999,191 A | * | 12/1999 | Frank et al. | 345/339 |
| 6,111,614 A | * | 8/2000 | Mugura et al. | 348/569 |
| 6,151,030 A | * | 11/2000 | DeLeeuw et al. | 345/431 |
| 6,215,503 B1 | * | 4/2001 | Snyder et al. | 345/433 |

* cited by examiner

*Primary Examiner*—Kristine Kincaid
*Assistant Examiner*—Mylinh Tran
(74) *Attorney, Agent, or Firm*—Park, Vaughan & Fleming LLP

(57) ABSTRACT

One embodiment of the present invention provides a system for viewing objects on a display that allows a user to scroll through the objects by varying a non-positional display attribute of the objects. This non-positional display attribute may include attributes such as transparency, fadedness and size. The system operates by receiving an intrinsic value for an object, which specifies a value for a display attribute associated with the object. The system also receives a reference value for the display attribute against which intrinsic values for objects are compared. This reference value may be received from a user through a scroll bar that is manipulated by the user. The system uses the intrinsic value and the reference value to compute a display value for the object. Next, the object is displayed using the display value to specify the non-positional display attribute for the object. Thus, in one embodiment of the present invention, objects that have an intrinsic value equal to reference value are displayed normally (opaquely) without any fading. Other objects that have a display value close the reference value are displayed translucently, giving the impression that objects are "emerging from the fog" or gradually "fading away." Objects with a large difference between the intrinsic value of the object and the reference value are not displayed at all.

22 Claims, 6 Drawing Sheets

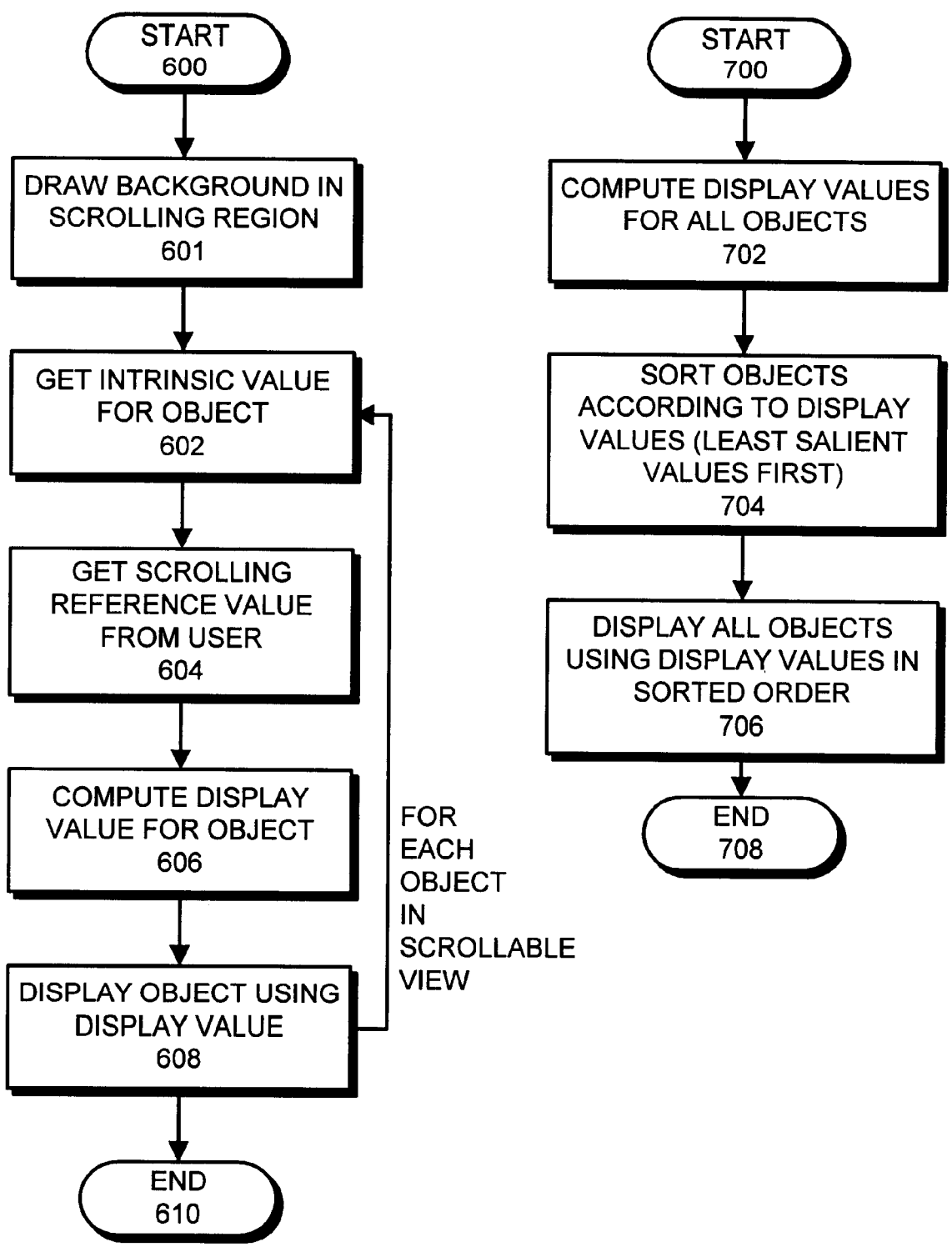
FIG. 6     FIG. 7

STATIONARY SCROLLING FOR USER INTERFACES

BACKGROUND

1. Field of the Invention

The present invention relates to user interfaces for computer systems. More particularly, the present invention relates to a method and apparatus for viewing a collection of objects on a display that allows a user to "scroll" through the objects by varying non-positional display attributes for objects, such transparency, color or size, instead of varying spatial location.

2. Related Art

One of the scarcest resources in today's computing devices is screen space. Even though the processing power and storage capacity of computing devices has increased by several orders of magnitude during the past twenty years, the average computer screen size has barely doubled. Although the resolution, clarity, and the overall quality of the displays has improved substantially, the actual size of the work area remains relatively limited. Screen space limitations are particularly apparent in the emerging pocket-sized computing devices and personal organizers. These pocket-sized computing devices often have display sizes that are less than a few hundred or a few thousand square pixels.

Spatial scrolling is a conventional and useful way to deal with limited screen real estate. When a user runs out of screen space, the user can scroll the display so that old objects move off the screen and new screen space becomes available. Conventional "spatial scrolling" suffers from a number of problems that undermine the benefits of the windows-icons-desktop-folders metaphor presently used in most user interfaces.

One problem is that spatial scrolling undermines spatial memory. User interfaces based upon the windows-icons-desktop-folders metaphor have proven quite powerful because they allow a user to organize data by placing icons at various "locations" on a computer display. Human users tend to have good "spatial memory," which allows them to remember that particular items are located at specific locations on a display. Spatial scrolling undermines spatial memory because objects move as they scroll across a display.

Another problem with spatial scrolling is "discontinuous salience." "Salience" is a measure of the prominence of an object in a display, in other words how much the object stands out from the rest of the display. As objects grow larger or become brighter they become more salient. However, when an object moves off the screen, its salience drops to zero. For example, in the case of three-dimensional scrolling, an object becomes increasingly salient as the object moves closer to the reference point of the display. However, salience drops to zero as the object passes through the forward clipping plane of the display. Furthermore, two objects that are close together in three-dimensional space appear to diverge and move apart across the screen as the reference point of the display moves closer to the objects.

What is needed is a method for scrolling through objects in a graphical display that preserves spatial memory and continuity of salience.

SUMMARY

One embodiment of the present invention provides a system for viewing objects on a display that allows a user to scroll through the objects by varying a non-positional display attribute of the objects. This non-positional display attribute may include attributes such as transparency, fadedness and size. The system operates by receiving an intrinsic value for an object, which specifies a value for a display attribute associated with the object. The system also receives a reference value for the display attribute against which intrinsic values for objects are compared. This reference value may be received from a user, for example through a scroll bar that is manipulated by the user. The system uses the intrinsic value and the reference value to compute a display value for the object. Next, the object is displayed using the display value to specify the non-positional display attribute for the object.

In one embodiment of the present invention, computing the display value for the object includes computing a difference between the intrinsic value for the object and the reference value. In a further variation, the function used to compute the display value is continuous and assumes a higher value when the absolute value of the difference approaches zero, and a lower value when the absolute value of the difference becomes large.

In one embodiment of the present invention, display values are computed for the objects before any objects are displayed. Next, the objects are sorted by display value and displayed in sorted order. This ensures that objects with smaller display values are not displayed on top of objects with larger display values.

In one embodiment of the present invention, objects that have the same value for a display attribute belong to the same "layer" and are hence displayed at the same time. Objects that have an intrinsic value equal to reference value are displayed normally (opaquely) without any fading. Other objects that have a display value close the reference value are displayed translucently, giving the impression that objects are "emerging from the fog" or gradually "fading away." Objects with a large difference between the intrinsic value of the object and the reference value are not displayed at all. This entire process is fully reversible and repeatable. Hence, a user can move the reference value higher and lower, viewing objects with different intrinsic values at varying levels of fading.

In one embodiment of the present invention, visualization of objects is implemented cumulatively. This means when the user moves the reference value higher, the display behaves as described above. However, when the user moves the reference value lower, the display shows cumulatively more and more objects until all possible objects become visible.

BRIEF DESCRIPTION OF THE FIGURES

FIG. 6 is a flow chart illustrating the process of displaying objects in accordance with an embodiment of the present invention.

FIG. 7 is a flow chart illustrating how objects are sorted by display value to establish a display order in accordance with an embodiment of the present invention.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs) and DVDs (digital video discs), and computer instruction signals embodied in a carrier wave. For example, the carrier wave may carry information across a communications network, such as the Internet.

Computer System

Figure 1:
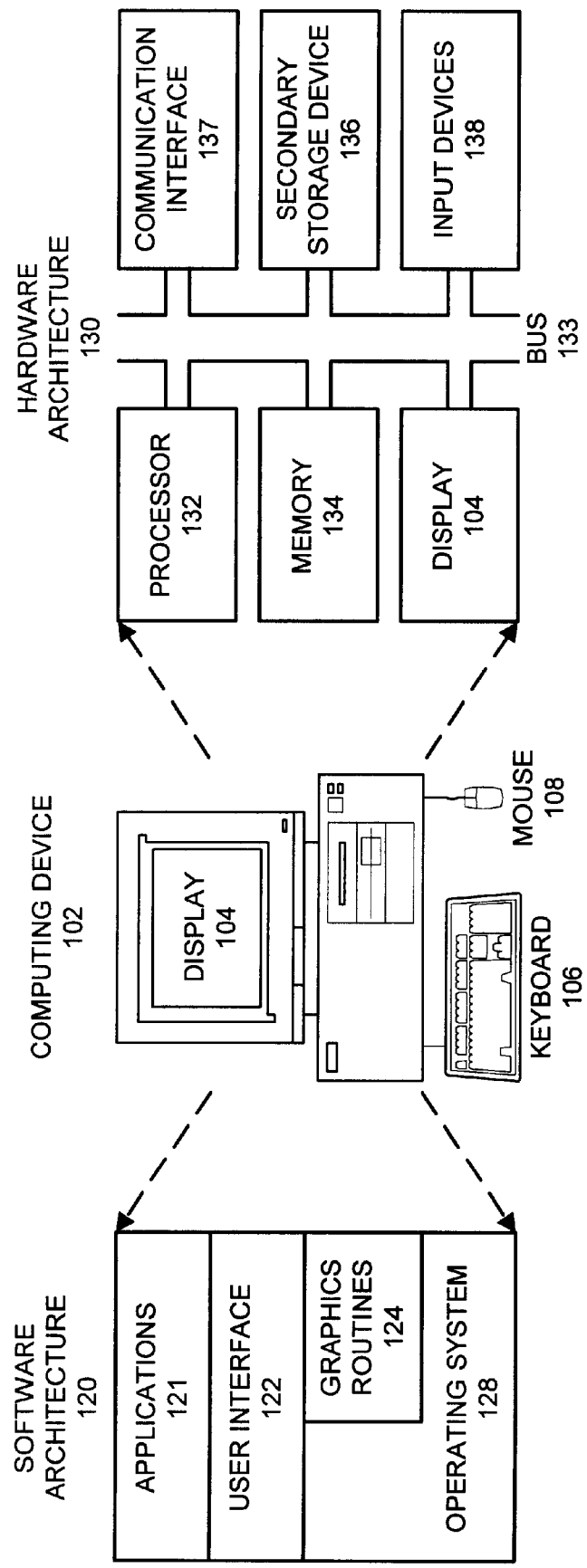
FIG. 1 illustrates a computing device in accordance with an embodiment of the present invention.

FIG. 1 illustrates computing device 102 in accordance with an embodiment of the present invention. Computing device 102 may include any type of computing device with a display, including a personal computer, a workstation or a mainframe computer system. Computing device 102 may additionally include portable computing devices, such as a personal organizer, a two-way pager, a cellular telephone or a mobile web browser.

Computing device 102 includes a display 104 for outputting data to a user. Computing device 102 also includes a number of input devices, including keyboard 106 and mouse 108, for receiving input from the user. Note that many other types of input devices can be used with the present invention, including input buttons on a personal organizer or a touch sensitive display. Display 104 may include any type of display device on a computer system, including but not limited to, a cathode ray tube, a flat panel display, a LCD display or an active matrix display.

Computing device 102 also includes software architecture 120. At the lowest level, software architecture 120 includes operating system 128, which supports the execution of applications on computing device 102. In one embodiment of the present invention, operating system 128 includes the WINDOWS operating system distributed by the Microsoft Corporation of Redmond, Wash. In another embodiment, operating system 128 includes the Palm OS that is contained within the Palm connected organizer, distributed by the 3COM corporation of Sunnyvale, Calif.

Alongside operating system 128 is graphics routines 124. Graphics routines 124 include any routines for facilitating the generation of images on display 104.

User interface 122 resides on top of operating system 128 and graphics routines 124. User interface 122 interacts with operating system 128 and graphics routines 124 to provide an output to display 104 in accordance with an embodiment of the present invention.

Finally, applications 121 reside on top of user interface 122. Applications 121 may include any type of applications running on computing device 102 that can be used in conjunction with user interface 122.

Computing device 102 also includes hardware architecture 130. Hardware architecture 130 includes processor 132, memory 134, display 104, secondary storage device 136, input devices 138 and communication interface 137. These components are coupled together by bus 133. Processor 132 may include any type of computational engine for executing programs within computing device 102. This includes, but is not limited to, a microprocessor, a device controller, and a computational device within an appliance. Memory 134 may include any type of random access memory for storing code and data for use by processor 132. Secondary storage device 136 may include any type of non-volatile storage device for storing code and data to for use by processor 132. This includes, but is not limited to, magnetic storage devices, such as a disk drive, and electronic storage devices, such as flash memory or battery backed up RAM. Display 104 (described above) may include any type of device for displaying images on a computer system. Input devices 138 may include any type of devices for inputting data into computing device 102. This includes keyboard 106 and mouse 108 as well as input buttons or a touch-sensitive display. Communication interface 137 may include any type of mechanism for communicating between computing device 102 and an external host. This may include a linkage to a computer network through electrical, infrared or radio signal communication pathways.

Stationary Scrolling

Figure 2:
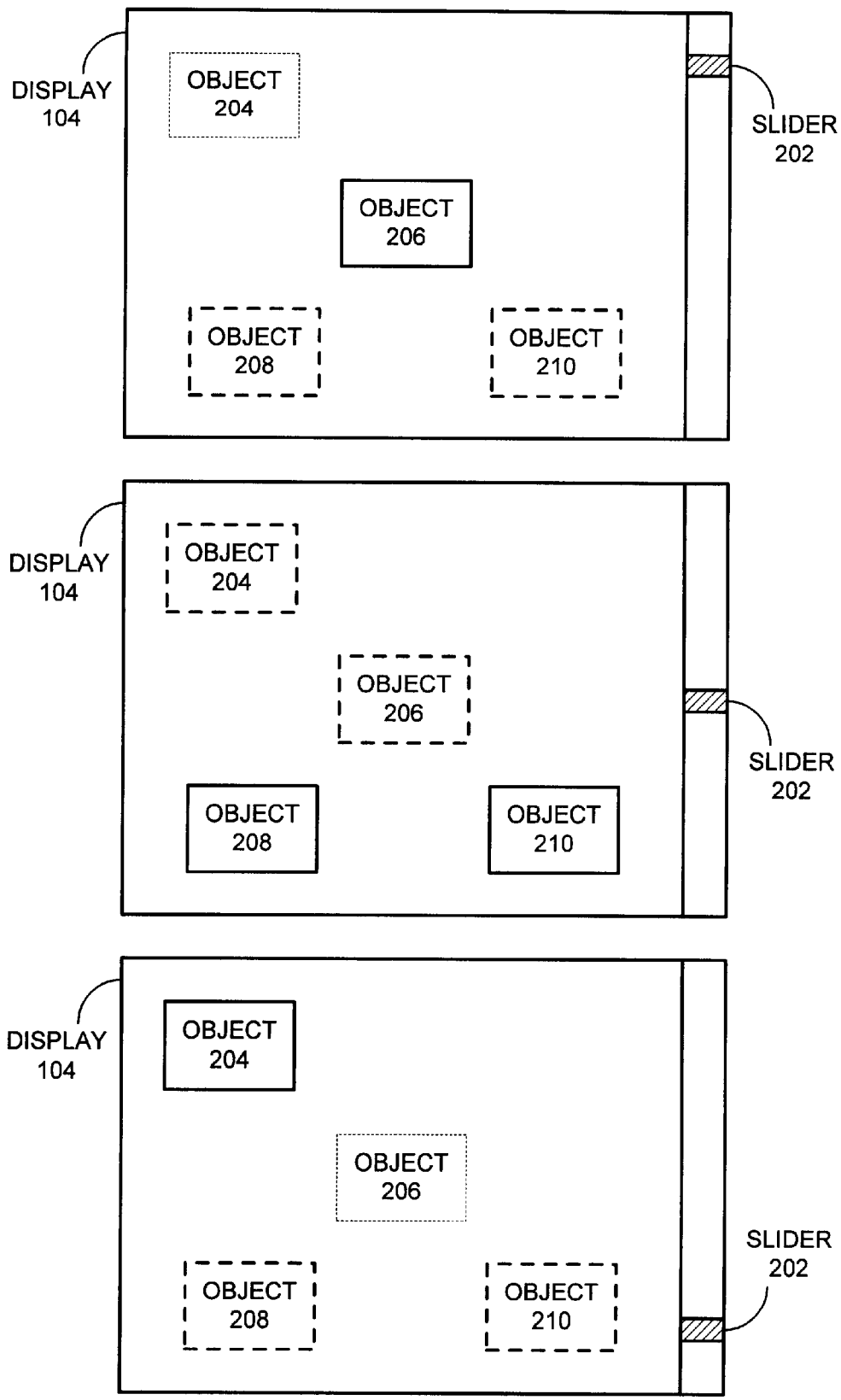
FIG. 2 illustrates one form of stationary scrolling in accordance with an embodiment of the present invention.

FIG. 2 illustrates one form of stationary scrolling in accordance with an embodiment of the present invention. In this embodiment, a number of objects 204, 206, 208 and 210 appear on display 104. Each of these objects has an "intrinsic value" for a particular display attribute. This intrinsic value is combined with a reference value for the attribute to produce a display parameter for the object. FIG. 2 presents three representations of display 104, a top display, a middle display and a bottom display, which depict display 104 at different points in time as slider 202 moves in a downward direction.

In the top display 104, objects 204, 208 and 210 are drawn with dashed lines. This indicates that objects 204, 208 and 210 have less salience than object 206, which is drawn with solid lines. Because objects 204, 208 and 210 have less salience, they appear more faded (or more transparent) than object 206.

Note that fading of an object can be implemented in different ways. Color or grayscale levels can be varied when drawing the object. Pixels of the object can be selectively changed to either blank or transparent while the object is being drawn. Alternatively, a predefined set of icons with varying levels of fadedness can be pre-defined for each type of display object.

Note that a user can change a scrolling reference value for the display by moving slider 202 up or down using a pointing device such as mouse 108.

In middle display 104, slider 202 has been moved in a downward direction so that the scrolling reference value is closer to intrinsic values for objects 208 and 210. Hence, objects 208 and 210 have greater salience and are drawn with solid lines. At the same time, the scrolling reference value is farther from the intrinsic value for object 206. Hence, object 206 has less salience so it is drawn with dashed lines. The scrolling reference value has also moved closer to the intrinsic value for object 204. Hence object 204 has more salience, but not as much as objects 208 and 210, so object 204 is still drawn with dashed lines.

In bottom display 104, slider 202 has been moved even further downward so that the scrolling reference value is closer to the intrinsic value for object 204. Hence, object 204 has greater salience and is drawn with solid lines. Objects 206, 208 and 210 have less salience, and are drawn with dashed lines.

Note that the spatial locations of objects 204, 206, 208 and 210 are preserved because objects 204,206 208 and 210 do not move. However, objects 204, 206, 208 and 210 may become less visible or even invisible as they fade or become more transparent.

Also note that discontinuity of salience is no longer a problem. An object becomes increasingly more salient as the scrolling reference value controlled by slider 202 comes closer to the intrinsic value of the object. A point of maximum salience is reached when the intrinsic value matches the scrolling reference value. When the scrolling reference value moves past the intrinsic value, salience gradually tails off and the object gradually fades or becomes more transparent. In one embodiment of the present invention, if the salience of an object falls below a threshold value, the object is no longer visible.

In one embodiment of the present invention, an object can be selected to remain at a fixed salience value (typically the maximum salience value) as the scrolling reference value changes. Hence, the display for this "fixed" object will not change as other objects in the display fade or become more transparent.

Figure 3:
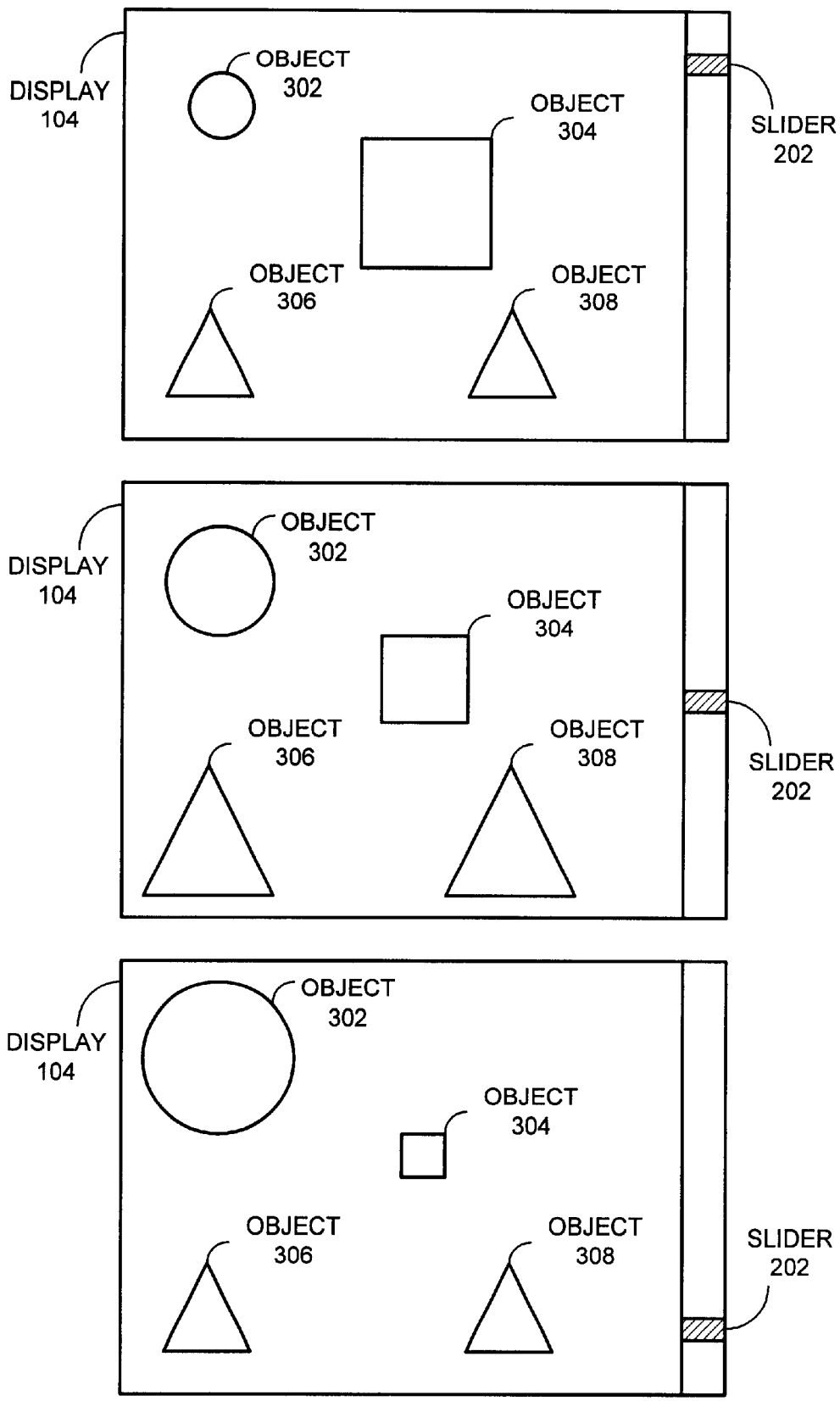
FIG. 3 illustrates another form of stationary scrolling in accordance with an embodiment of the present invention.

FIG. 3 illustrates another form of stationary scrolling in accordance with another embodiment of the present invention. In the embodiment illustrated in FIG. 3, salience is represented by relative sizes of objects. As the salience of an object increases, the object grows larger. Conversely, as the salience of an object decreases the object becomes smaller.

For example, in FIG. 3, in top display 104, object 304 has a large salience, and is hence represented by a large square. In middle display 104 and bottom display 104, as slider 202 moves downward the salience of object 304 diminishes because the scrolling reference value controlled by slider 202 moves away from the intrinsic value of object 304. Hence, the size of object 304 decreases.

For object 302 the reverse is true. In top display 104, object 302 has a low salience value and is represented by a small circle. In middle display 104 and bottom display 104, as slider 202 moves downward, the salience of object 302 increases. Hence, the size of object 302 increases.

Objects 306 and 308 behave differently. They have the highest salience in middle display 104 and are hence represented by large triangles. In the top display 104 and the bottom display 104, the salience of objects 306 and 308 decreases, hence the size of objects 306 and 308 decreases.

Scrolling of both the stationary variety and the non-stationary variety can be described more formally as follows. Consider a set of displayable objects, $O=\{O_i\}$ with each element $O_i$ located in an abstract N-dimensional space, S. The location of each object $O_i$ in this space is an N-dimensional vector, x. We call vector x the display location in S. The numbers in x determine how an object appears on the screen, and therefore affect the salience of the object as perceived by the user.

The components of x may represent visual characteristics such as horizontal and vertical position on the screen, transparency, fadedness, and size. Note these visual characteristics affect the objects salience, but not its identity: moving an object through this space S will not substantially affect the user's perception of what the object is, merely how it looks. For example, simply changing the position of a document icon does not change the user's ability to identify it, whereas scrambling the colors, replacing the shape, and embedding an arbitrary bitmap in its surface may make identification difficult.

The components of x may also represent other display attributes, such as shape, saturation of color, hue, the speed with which the object blinks or wiggles, the degree to which the object is in focus or blurred, the thickness of the object's outline, and so forth.

To define scrolling, we associate with the user with a scrolling reference parameter p in S. In conventional text scrolling for example, p is a single number representing the vertical offset of the user's current view into the document: the value of p is determined by the position of the scroll bar. In one possible definition for scrolling, set 0 is scrollable if each object $O_i$ also has an intrinsic location $x_I$, in S which is related to the display location x through the scrolling reference parameter, p,and a scrolling function,f. In other words, $x=f(x_I-p)$.

Both f and p are in general vectors so they may affect more than one aspect of the display location. Furthermore, in order to be useful in a conventional way, f(x) usually takes on values associated with greatest salience at or near x=0.

An infinite number of different functions may be used for f. These functional preferably have the greatest value (or salience) when the absolute value of $x_I-p$ is small, and a smaller value when the absolute value of xI−p is large. In this way, an object's salience will be greatest when the user's scrolling reference value is closest to the intrinsic value of the object. Also, these functions are preferably smoothly varying to preserve continuity of salience. For example, the function can be $f(x)=A\exp(-x^2/r^2)$ or $f(x)=c^2/(c^2+x^2)$. Both of these are smoothly varying functions that reach a peak when x=0.

Visualization Subsystem

Figure 4:
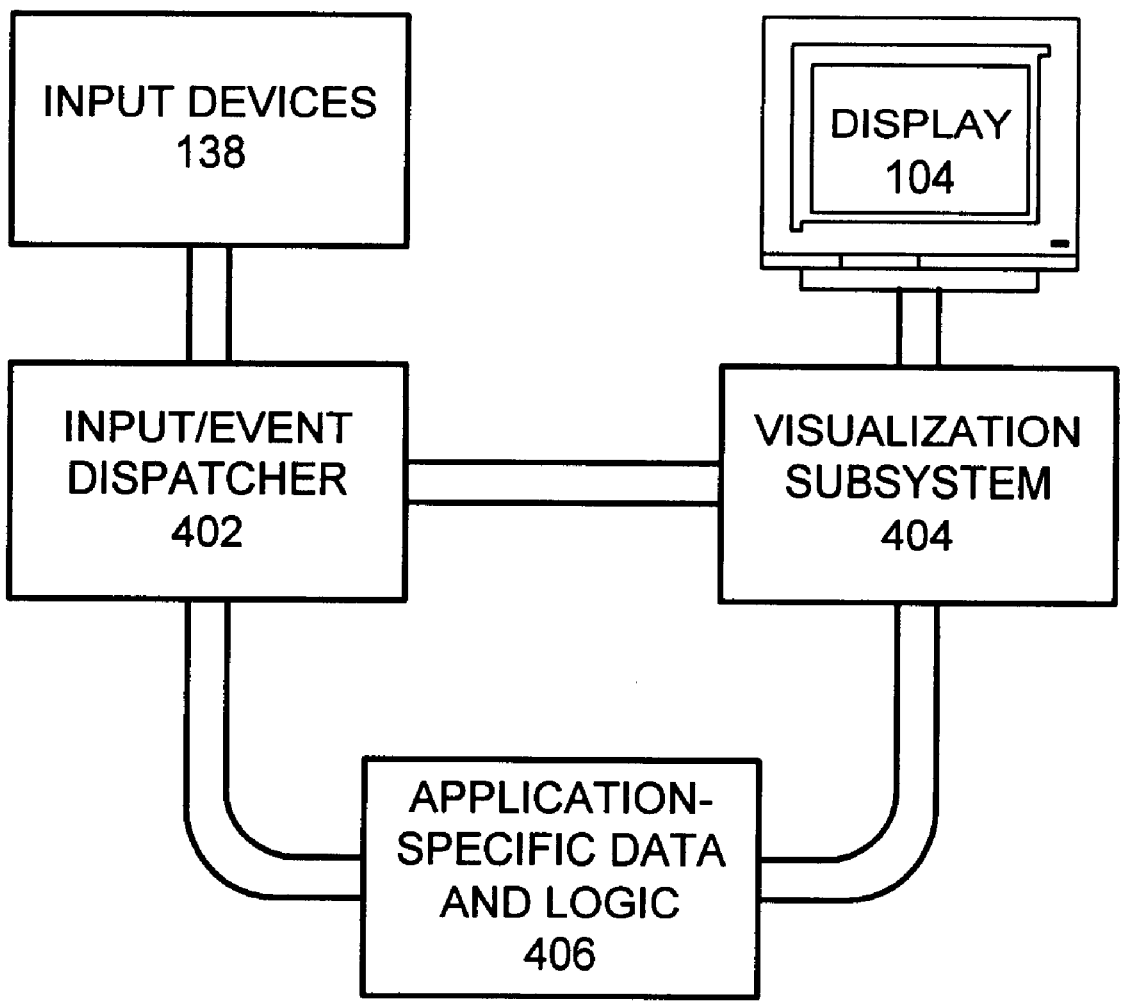
FIG. 4 illustrates how computer system components connect with the visualization subsystem in accordance with an embodiment of the present invention.

FIG. 4 illustrates how components in computing device 102 connect with visualization subsystem 404 in accordance with an embodiment of the present invention. Visualization subsystem 404 handles drawing and outputting of objects to display 104. As part of these duties, visualization subsystem 404 implements stationary scrolling.

Visualization subsystem 404 is coupled to application specific logic and data 406, which contains code and data to implement the underlying non-visual functions of an application. For example, application specific logic and data 406 can compute a bank account balance, while visualization subsystem 404 can display the bank account balance.

Both visualization subsystem 404 and application-specific code and logic 406 receive input from input/event dispatcher 402, which itself receives input from a user operating input devices 138. Input devices 138 may include, for example, keyboard 116 and mouse 108 from FIG. 1. Finally, visualization subsystem 404 outputs images of the objects to display 104.

Figure 5:
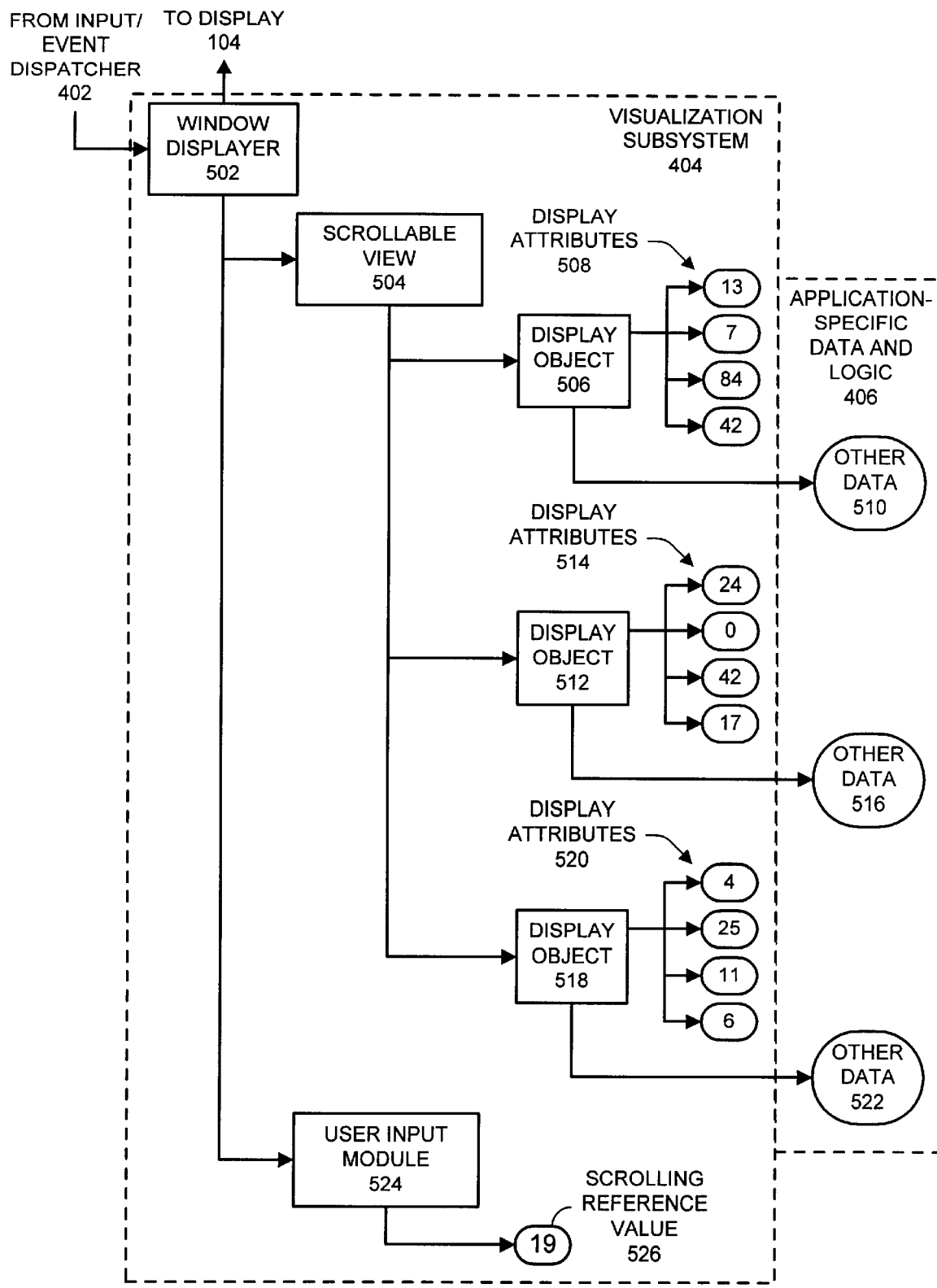
FIG. 5 illustrates the structure of the visualization subsystem in accordance with an embodiment of the present invention.

FIG. 5 illustrates the internal structure of visualization subsystem 404 in accordance with an embodiment of the present invention. Visualization subsystem 404 includes window displayer 502, which controls the displaying of objects in display 104.

Window displayer 502 communicates with scrollable view 504 and user input module 524. Scrollable view 504 controls the scrolling of a collection of display objects. In the embodiment illustrated in FIG. 3, scrollable view 504 controls display objects 506, 512 and 518. Each display object contains a number of display attributes containing numbers. These display attributes may specify color, size and positional attributes for the object. More specifically, display object 506 includes display attributes 508, display object 512 includes display attributes 514, and display object 518 includes display attributes 520.

Display objects 506, 508 and 510 are also associated with other non-display related data, such as bank account balances, contained in application-specific data and logic 406. More specifically, display object 506 is associated with other data 510, display object 512 is associated with other data 516, and display object 518 is associated with other data 522.

In order to compute the above-described functions, window displayer 502 accesses scrolling reference value 526 through user input module 524. A user may enter a scrolling reference value 526 by moving slider 202 (from FIG. 2) using mouse 108 (from FIG. 1). This causes input/event dispatcher 402 to send scrolling reference value 526 through window displayer 502 into user input module 524. User input module 524 finally stores scrolling reference value 526.

Window displayer 502 also includes methods to calculate display values for display objects 506, 512 and 518 based on scrolling reference value 526.

Process of Displaying Objects

FIG. 6 is a flow chart illustrating the process of displaying objects in accordance with an embodiment of the present invention. The system starts by drawing a background against which the objects are to be displayed (step 601). Drawing this background may include blanking out or overwriting an existing display. For each object to be displayed, the system gets an intrinsic value for the object, which is a value for a non-positional display attribute (step 602). The system also receives a scrolling reference value 526 (step 604). This scrolling reference value 526 may be received from a user through a user interface, such as slider 202 in FIG. 1. Alternatively, scrolling reference value 526 may be taken from another source, such as a system clock. Next, the system uses a function to compute a display value for the object based upon the intrinsic value for the object and the scrolling reference value 526. Recall that this display value may be calculated as a function of the difference between the object's intrinsic value and the scrolling reference value 526. Finally, the object is displayed using the calculated display value to specify the non-positional display attribute (step 608).

FIG. 7 is a flow chart illustrating how objects are sorted by display value to establish a display order in accordance with an embodiment of the present invention. It is desirable for objects with greater salience to be displayed more prominently than objects with less salience. Hence, it is desirable for objects with greater salience to be drawn later than objects with less salience, so that objects with less salience do not cover or obscure objects with greater salience. To this end, it is desirable to draw objects in increasing order of salience. The system accomplishes this by first computing display values for all objects in the display (step 702). After the display values have been computed, the system sorts the objects in ascending order of display value (step 704). Finally, the system draws the objects on the display in increasing order of display value from lowest display value to highest display value.

The foregoing descriptions of embodiments of the invention have been presented for purposes of illustration and description only. They are not intended to be exhaustive or to limit the invention to the forms disclosed. Accordingly, many modifications and variations will be apparent to practitioners skilled in the art. Additionally, the above disclosure is not intended to limit the invention. The scope of the invention is defined by the appended claims.

What is claimed is:

1. A method for viewing a plurality of objects on a graphical display that allows a user to scroll through the plurality of objects by varying transparency of the plurality of objects, comprising:

receiving an intrinsic value for an object, the intrinsic value specifying a value for a non-positional display attribute for the object;

receiving a reference value for the non-positional display attribute against which intrinsic values for objects are compared, the reference value being received from a scroll bar that is manipulated by the user;

computing a display value for the object as a function of a difference between the intrinsic value and the reference value, wherein the function assumes a higher value when an absolute value of the difference approaches zero and a lower value when the absolute value of the difference becomes large; and displaying the object using the display value to specify a transparency for the object;

wherein the steps of, receiving the intrinsic value, receiving the reference value, computing the display value and displaying the object are repeated for the plurality of objects on the graphical display.

2. The method of claim 1, wherein the non-positional display attribute is one of transparency, fadedness and size.

3. The method of claim 1, wherein the steps of, receiving the intrinsic value, receiving the reference value, computing the display value and displaying the object are repeated for the plurality of objects.

4. The method of claim 1, wherein the step of computing the display value is completed for the plurality of objects before any objects are displayed, and further comprising:

sorting the plurality of objects by display value; and displaying the plurality of objects in sorted order so that objects with smaller display values do not obscure objects with larger display values.

5. The method of claim 1, wherein receiving the reference value includes receiving an input specifying the reference value from the user.

6. The method of claim 1, wherein receiving the reference value entails receiving an input from a scroll bar that is manipulated by the user.

7. The method of claim 1, wherein computing the display value for the object includes computing a difference between the intrinsic value for the object and the reference value.

8. The method of claim 7, wherein the function assumes a higher value when an absolute value of the difference approaches zero and a lower value when the absolute value of the difference becomes large.

9. The method of claim 1, wherein the non-positional display attribute includes a combination of multiple non-positional display attributes.

10. The method of claim 1, further comprising drawing a background for the object before displaying the object.

11. The method of claim 1, wherein displaying the object includes not displaying the object if the display value for the object falls below a threshold value.

12. The method of claim 1, wherein computing a display value for the object includes using a fixed display value if the object has been selected to remain fixed in the display without scrolling.

13. A computer readable storage medium storing instructions that when executed by a computer cause the computer to perform a method for viewing a plurality of objects on a graphical display that allows a user to scroll through the plurality of objects by varying a non-positional display attribute of the plurality of objects, comprising:

receiving an intrinsic value for an object, the intrinsic value specifying a value for the non-positional display attribute for the object;

receiving a reference value for the non-positional display attribute against which intrinsic values for objects are compared, the reference value being received from a scroll bar that is manipulated by the user;

computing a display value for the object as a function of a difference between the intrinsic value and the reference value, wherein the function assumes a higher value when an absolute valued of the difference approaches zero and a lower value when the absolute value of the difference becomes large; and displaying the object using the display value to specify the non-positional display attribute for the object;

wherein the steps of, receiving the intrinsic value, receiving the reference value, computing the display value and displaying the object are repeated for the plurality of objects on the graphical display.

14. The medium of claim 12, wherein the non-positional display attribute is one of transparency, fadedness and size.

15. The medium of claim 12, wherein the input receiving mechanism, the computing mechanism and the display mechanism are configured to operate on each object in the plurality of objects.

16. The medium of claim 12, wherein the display mechanism is configured to:

sort the plurality of objects by display value; and display the plurality of objects in sorted order so that objects with smaller display values do not obscure objects with larger display values.

17. The medium of claim 12, wherein the input receiving mechanism is configured to receive the reference value from the user.

18. The medium of claim 12, wherein the input receiving mechanism is configured to receive an input specifying the reference value from a scroll bar that is manipulated by the user.

19. The medium of claim 12, wherein the computing mechanism is configured to compute a function of a difference between the intrinsic value for the object and the reference value.

20. The medium of claim 17, wherein the function assumes a higher value when an absolute value of the difference approaches zero and a lower value when the absolute value of the difference becomes large.

21. The medium of claim 12, wherein the non-positional display attribute includes a combination of multiple non-positional display attributes.

22. The medium of claim 12, wherein the display mechanism is configured to draw a background for the object before displaying the object.

* * * * *